… … …

United States Patent [19]
Taki

[11] Patent Number: 5,911,062
[45] Date of Patent: Jun. 8, 1999

[54] DATA ACQUISITION METHOD AND PROTOCOL CONTROLLER CIRCUIT

[75] Inventor: Nobuhiro Taki, Kasugai, Japan

[73] Assignee: Fujitsu Limited, Kawasaki, Japan

[21] Appl. No.: 08/991,884

[22] Filed: Dec. 16, 1997

[30] Foreign Application Priority Data

Apr. 24, 1997 [JP] Japan .................................. 9-107547

[51] Int. Cl.$^6$ .................................................. G06F 3/00
[52] U.S. Cl. ........................................................ 395/551
[58] Field of Search ................................. 395/551, 847; 365/200, 230.03; 375/371

[56] References Cited

U.S. PATENT DOCUMENTS

| 5,179,536 | 1/1993 | Kasa et al. ............................... 365/200 |
| 5,428,648 | 6/1995 | Fukuda ..................................... 375/371 |
| 5,826,107 | 10/1994 | Cline et al. ............................. 395/847 |
| 5,831,924 | 9/1996 | Nitta et al. .......................... 365/230.03 |

Primary Examiner—Hassan Kizou
Assistant Examiner—Omar A. Omar
Attorney, Agent, or Firm—Staas & Halsey

[57] ABSTRACT

A protocol control circuit for transferring data conforms to the IEEE 1394 standard. The control circuit includes a decoder and RS-type flip-flops.

28 Claims, 8 Drawing Sheets

DATA ACQUISITION METHOD AND PROTOCOL CONTROLLER CIRCUIT

BACKGROUND OF THE INVENTION

The present invention relates to a data acquisition method and circuit, and, more particularly, to a protocol controller for IEEE 1394, suitable for a data processor which conforms to IEEE 1394 standards or serial interface standards.

Recently, due to the progress in multimedia systemization, various kinds of peripheral devices have been connected to a personal computer. Such peripheral devices include a digital camera, a digital VCR and a color printer. Such peripheral devices handle vast amounts of audio and video data and demand fast data transfer between a computer and its peripheral devices. Attention has been paid to IEEE 1394, which defines serial interface standards, as an interface suitable for such fast data transfer.

Data transfers which conform to IEEE 1394 use a data line and a strobe line. A data strobe (DS) link system is preferably employed to acquire data which is output from the data line. The data acquisition according to the DS link system also demands fast data transfer and increased amount of data to be transferred.

The DS link system has a data line and a strobe line provided in a bus between a computer, such as a personal computers, and peripheral devices and also in a bus between the peripheral devices. Transfer data is output onto the data line, while a strobe signal is sent to the strobe line. When identical transfer data bit D1 is transferred serially from the data line (when the transfer data bit D1 is not inverted), as shown in FIG. 1, a strobe signal SB is inverted in accordance with the transfer of the transfer data bit D1. When different transfer data bits D1 are transferred (when the transfer data bit D1 is inverted), the strobe signal SB is not inverted.

More specifically, suppose that the same transfer data bit D1, "1", is transferred twice, consecutively. In this case, when the strobe signal SB corresponding to the first transfer data bit D1 is "1", the next strobe signal SB is inverted to "0". When the first strobe signal SB is "0", on the other hand, the next strobe signal SB is inverted to "1". When the same transfer data bit D1 of "0" is transferred twice consecutively, the strobe signal SB is also inverted as mentioned above.

A description will now be given of the case where the transfer data bit D1 of "1" and transfer data bit D1 of "0" are transferred successively. When the strobe signal SB corresponding to the first transfer data bit D1 of "1" is "1", the next strobe signal SB stays "1". When the first strobe signal SB is "0", the next strobe signal SB likewise remains "0". When the transfer data bit D1 of "0" and transfer data bit D1 of "1" are transferred successively, the output of the same strobe signal SB of "1" or "0" is maintained as described above coincidence and uncoincidence of the transfer data bit D1 and the strobe signal SB. In this manner, every time one transfer data bit D1 is transferred, coincidence and uncoincidence of the transfer data bit D1 and the strobe signal SB are alternately repeated. In the DS link system, a clock signal for acquiring data is generated by performing an exclusive OR of the transfer data bit D1 and the strobe signal SB which alternately repeat such coincidence and uncoincidence.

FIG. 2 is a block diagram of a conventional data acquisition circuit which generates a clock signal to acquire data. The data acquisition circuit includes first and second D flip-flops 51 and 52, an exclusive OR gate 53 and an inverter 54. The exclusive OR gate 53 receives a transfer data bit D1 and a strobe signal SB, and outputs a clock CLK. The clock signal is low or "0" when D1 and SB match or coincide with each other and high or "1" when D1 and SB do not match with each other. A delay circuit 55 serves to delay the clock CLK from the exclusive OR gate 53.

The first flip-flop 51 receives the inverted clock CLK via the inverter 54, latches the current transfer data bit D1 in response to the falling of the clock CLK, and then outputs data D1even. This data D1even represents the transfer data bit D1 when the transfer data bit D1 coincides with the strobe signal SB.

The second flip-flop 52 latches the current transfer data bit D1 in response to the rising of the clock CLK, and then outputs data D1odd. This data D1odd represents the transfer data bit D1 when the transfer data bit D1 and the strobe signal SB do not coincide with each other. In this way, the transfer data bit D1 which is transferred from the data line is output from the first and second flip-flops 51 and 52 alternately in accordance with the clock CLK.

As shown in FIG. 3, the inversion timing of the clock CLK is delayed by time td from the inversion timing of the transfer data bit D1 or the strobe signal SB. The delay time td is produced by the delay circuit 55. This delay time td provides a setup time for the first and second flip-flops 51 and 52 to securely latch the transfer data bit D1.

The period of the clock CLK tends to become shorter as data transfer becomes faster. The shortened clock period makes it difficult to secure the sufficient hold time for the first and second flip-flops 51 and 52 to hold the transfer data bit. To provide a sufficient hold time, the setup time is set as short as possible. It is however very difficult to design the delay circuit 55 to make the setup time as short as possible. Further, the manufacture of such delay circuits requires very precise technology and often has in a poor yield for the circuits.

Accordingly, it is an objective of the present invention to provide a data acquisition method and circuit which does not need an adjustment of the setup time or hold time for data transfer.

SUMMARY OF THE INVENTION

Briefly, the present invention is directed to a data acquisition circuit for acquiring transfer data having first and second logical values using a strobe signal having first and second logical values. The transfer data and the strobe signal being arranged such that coincidence and uncoincidence of the first and second logical values thereof are alternately repeated. The data acquisition circuit includes a decoder and first and second elements. The decoder determines a coincidence and an uncoincidence between the transfer data and the strobe signal. When there is a coincidence, the decoder outputs a first or second discrimination signal. The first discrimination signal indicates coincidence between the first logical values of the transfer data and strobe signals. The second discrimination signal indicates coincidence between the second logical values of the transfer data and strobe signals. When there is an uncoincidence, the decoder further outputting a third or fourth discrimination signal. The third discrimination signal indicates uncoincidence between the first logical value of the transfer data and the second logical value of the strobe signal. The fourth discrimination signal indicates uncoincidence between the second logical value of the transfer data and the first logical value of the strobe signal. The first element is connected to the decoder and outputs a signal having the first logical value in response to the first discrimination signal and further outputs a signal having the second logical value in response to the second discrimination signal. The second element is connected to the decoder and outputs a signal having the first logical value in response to the third discrimination signal and further outputs a signal having the second logical value in response to the fourth discrimination signal.

The present invention further provides a data acquisition circuit including the decoder, a plurality of first and second elements, first and second write pointers, and first and second read pointers. The first write pointer is connected to the plurality of first elements and selectively enables one of the first elements. The first read pointer is connected to the plurality of first elements and selectively enables one of the first elements to output a signal having one of the first and second logical values. The second write pointer is connected to the plurality of second elements and selectively enables one of the second elements. The second read pointer is connected to the plurality of second elements and selectively enables one of the second elements to output a signal having one of the first and second logical values.

The present invention further provides a protocol controller for implementing IEEE 1394 compatible data acquisition. The controller includes a protocol controller circuit having the data acquisition circuit.

The present invention provides a data acquisition method for acquiring transfer data using a strobe signal. The transfer data and the strobe signal is arranged such that coincidence and uncoincidence of first and second logical values thereof are alternately repeated. The method includes the steps of: (a) determining a coincidence and an uncoincidence between the transfer data and the strobe signal, (b) generating first and second discrimination signals when there is a coincidence, the first discrimination signal indicating coincidence between the first logical values of the transfer data and strobe signal, the second discrimination signal indicating coincidence between the second logical values of the transfer data and strobe signal, (c) generating third and fourth discrimination signals when there is an uncoincidence, the third discrimination signal indicating uncoincidence between the first logical value of the transfer data and the second logical value of the strobe signal, the fourth discrimination signal indicating uncoincidence between the second logical value of the transfer data and the first logical value of the strobe signal; (d) generating a signal having the first logical value in response to the first discrimination signal; (e) generating a signal having the second logical value in response to the second discrimination signal; (f) generating a signal having the first logical value in response to the third discrimination signal; (g) generating a signal having the second logical value in response to the fourth discrimination signal.

The present invention further provides a data acquisition method for acquiring transfer data using a strobe signal. The transfer data and the strobe signal being arranged such that coincidence and uncoincidence of first and second logical values thereof are alternately repeated, the data acquisition method comprising the steps of: (a) determining a coincidence and an uncoincidence between the transfer data and the strobe signal; (b) generating a first discrimination signal and a second discrimination signal when there is a coincidence, the first discrimination signal indicating coincidence between the first logical values of the transfer data and the strobe signal, a second discrimination signal indicating coincidence between the second logical values of the transfer data and the strobe signal; (c) generating a third discrimination signal and a fourth discrimination signal when there is an uncoincidence, the third discrimination signal indicating uncoincidence between the first logical value of the transfer data and the second logical value of the strobe signal, the fourth discrimination signal indicating uncoincidence between the second logical value of the transfer data and the first logical value of the strobe signal; (d) generating a first plurality of signals, each having the first logical value, in response to the first discrimination signal using a respective plurality of first elements; (e) generating a second plurality of signals, each having the second logical value, in response to the second discrimination signal using the plurality of first elements; (f) selectively enabling one of the first elements to generate an output signal having one of the first and second logical values; (g) selectively enabling one of the first elements to output the signal having one of the first and second logical values; (h) generating a third plurality of signals, each having the first logical value, in response to the third discrimination signal using a respective plurality of second elements; (i) generating a fourth plurality of signals, each having the second logical value, in response to the fourth discrimination signal using the plurality of second elements; (j) selectively enabling one of the plurality of second elements to generate an output signal having one of the first and second logical values; and (k) selectively enabling one of the plurality of second elements to output the output signal having one of the first and second logical values.

The present invention provides a protocol control circuit. The protocol control includes a decoder and first and second SR-type flip-flops. The decoder receives a data signal and a strobe signal, the data signal serially transferring bits of data in accordance with a predetermined period and the strobe signal being set to alternately match and not match the bits of data of the data signal. The decoder further outputs first and second coincident signals and first and second not coincident signals. The first SR-type flip-flop is connected to the decoder. A set input terminal thereof receives the second coincident signal and a reset input terminal thereof receives the first coincident signal. The first flip-flop generates a dataeven signal therefrom. A second SR-type flip-flop is connected to the decoder. A set input terminal thereof receives the second not coincident signal and a reset input terminal thereof receives the first not coincident signal. The second flip-flop generates a dataodd signal therefrom.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

Figure 1:
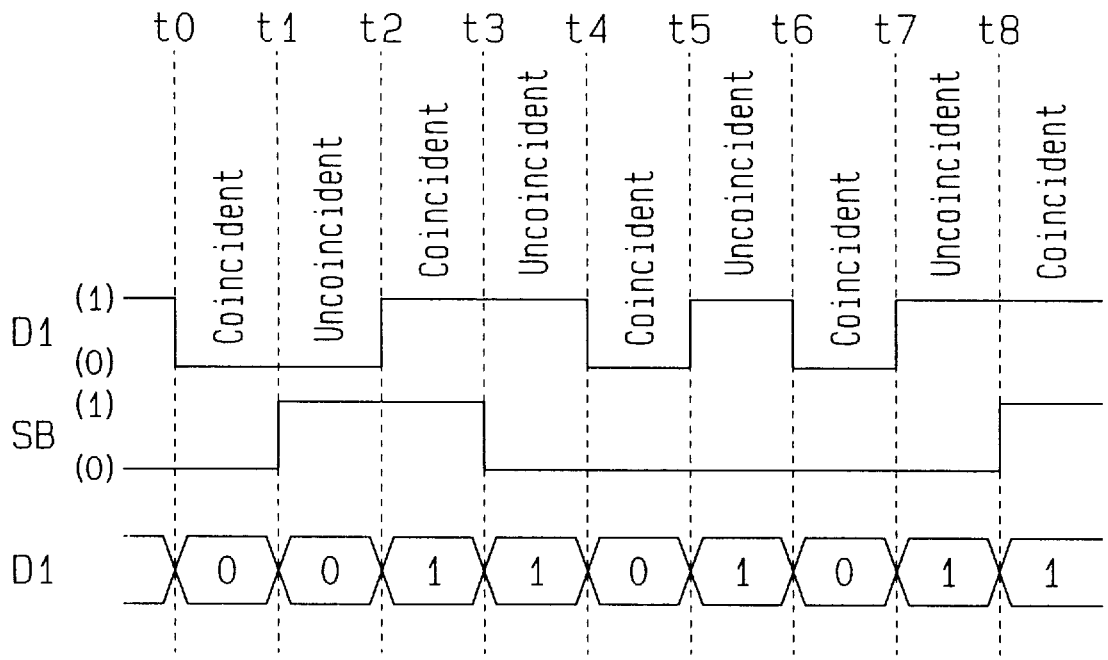
FIG. 1 shows data transfer according to a DS link system.
Figure 2:
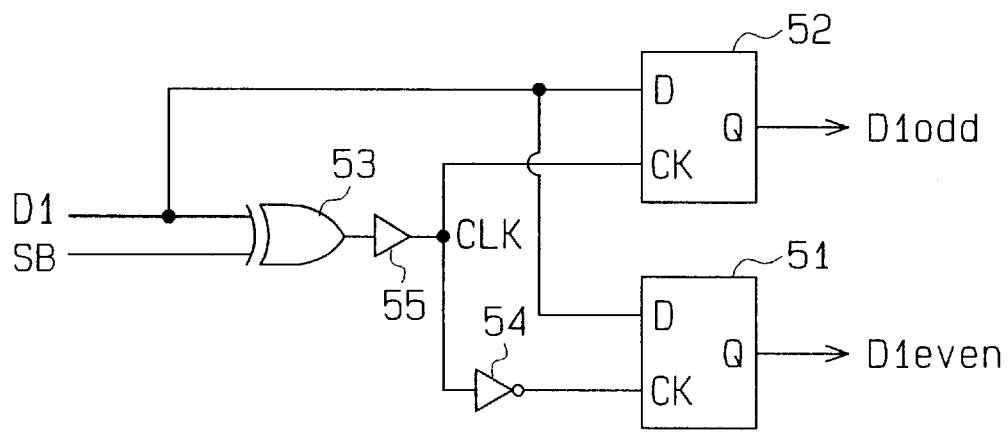
FIG. 2 is a schematic block diagram of a conventional data acquisition circuit.
Figure 3:
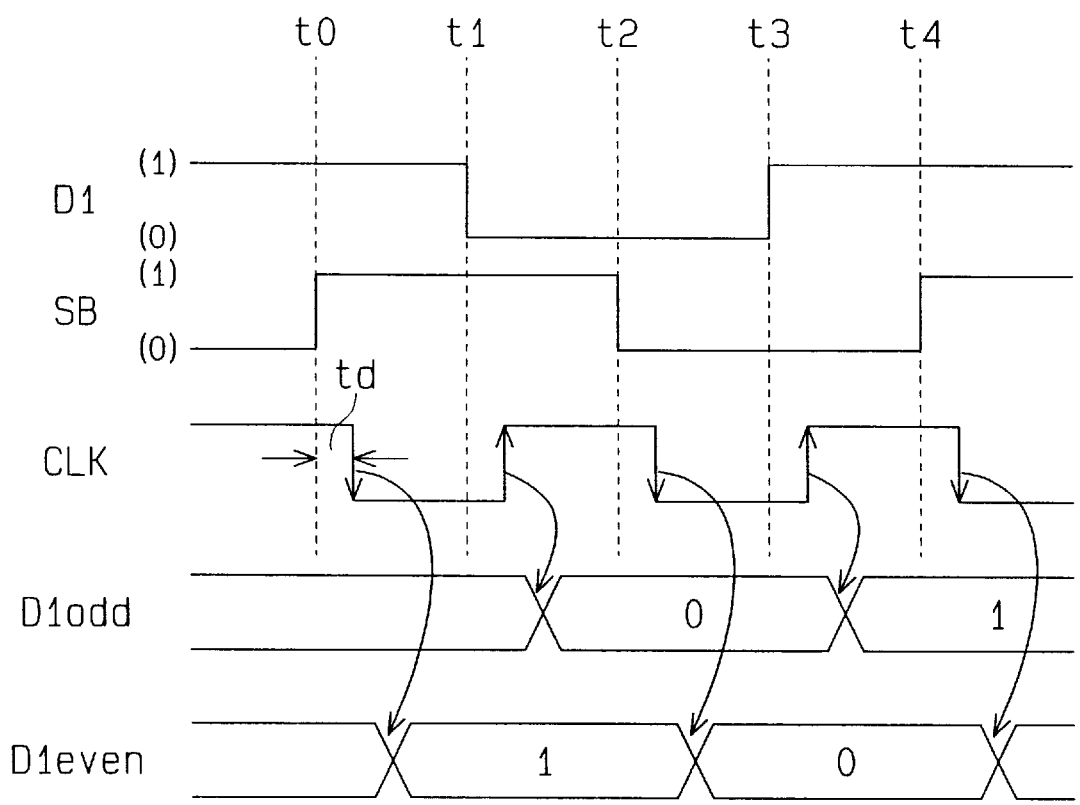
FIG. 3 is a time chart illustrating the operation of the conventional data acquisition circuit of FIG. 2.
Figure 4:
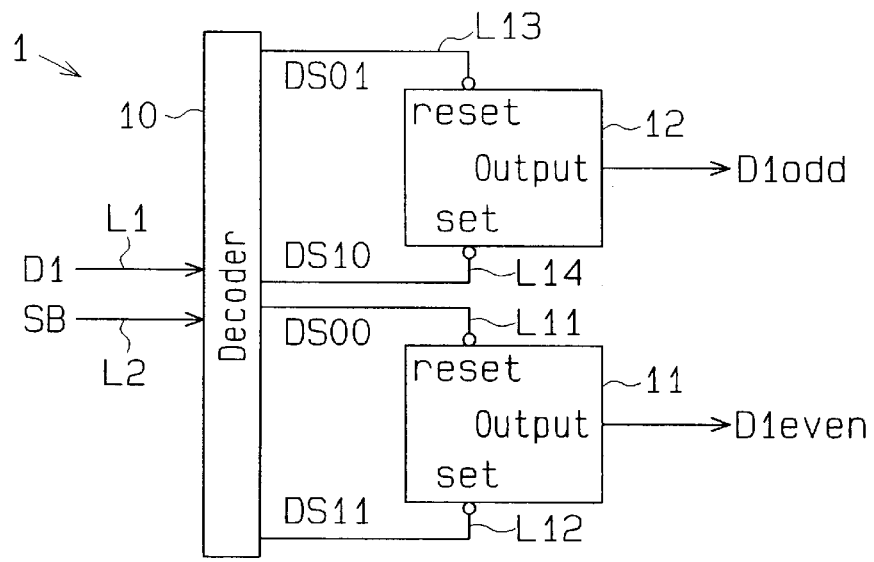
FIG. 4 is a schematic block diagram of a data acquisition circuit according to a first embodiment of the present invention.

FIG. 4 is a schematic block diagram of a data acquisition circuit 1 according to a first embodiment of the present invention. The data acquisition circuit 1 is preferably provided in a one-chip semiconductor integrated circuit device (e.g., LSI). The data acquisition circuit 1 includes a decoder 10, a first set-reset (first SR) element 11 and a second set-reset (second SR) element 12.

The decoder 10 is connected to a data line L1 and a strobe line L2. The data line L1 is used to input a transfer data bit D1 which is serially transferred in accordance with a given period. The strobe line L2 inputs a strobe signal SB, which is a signal so set that a logic level matching with the logic level of the transfer data bit D1 and a logic level different from the latter logic level are alternately repeated.

The decoder 10 receives the transfer data bit D1 and the strobe signal SB, and outputs a first coincident signal DS00, a second coincident signal DS11, a first uncoincident signal DS01 and a second uncoincident signal DS10 each having an L level (logic "0") or an H level (logic "1") as follows.

(A) When the transfer data bit D1 is "0" and the strobe signal SB is "0", the first coincident signal DS00 has an L level, the second coincident signal DS11 has an H level, the first uncoincident signal DS01 has an H level, and the second uncoincident signal DS10 has an H level.

(B) When the transfer data bit D1 is "0" and the strobe signal SB is "1", the first coincident signal DS00 has an H level, the second coincident signal DS11 has an H level, the first uncoincident signal DS01 has an L level, and the second uncoincident signal DS10 has an H level.

(C) When the transfer data bit D1 is "1" and the strobe signal SB is "0", the first coincident signal DS00 has an H level, the second coincident signal DS11 has an H level, the first uncoincident signal DS01 has an H level, and the second uncoincident signal DS10 has an L level.

(D) When the transfer data bit D1 is "1" and the strobe signal SB is "1", the first coincident signal DS00 has an H level, the second coincident signal DS11 has an L level, the first uncoincident signal DS01 has an H level, and the second uncoincident signal DS10 has an H level.

The first SR element 11 has a set input terminal for receiving the second coincident signal DS11 and a reset input terminal for receiving the first coincident signal DS00. In response to the falling of the first coincident signal DS00 from the H level to the L level, the first SR element 11 performs a reset operation and outputs an output signal D1even of logic "0" from its output terminal. In response to the falling of the second coincident signal DS11 from the H level to the L level, the first SR element 11 performs a set operation and outputs an output signal D1even of logic "1" from the output terminal.

The second SR element 12 has a set input terminal for receiving the second uncoincident signal DS10 and a reset input terminal for receiving the first uncoincident signal DS01. In response to the falling of the first uncoincident signal DS01 from the H level to the L level, the second SR element 12 performs a reset operation and outputs an output signal D1odd of logic "0" from its output terminal. In response to the falling of the second uncoincident signal DS10 from the H level to the L level, the second SR element 12 performs a set operation and outputs an output signal D1odd of logic "1" from the output terminal. The first and second SR elements 11 and 12 preferably comprise RS flip-flops. In this case, it is preferable that the output signal D1even or D1odd is output from the output terminal that corresponds to the set input terminal, in that the transfer data bit D1 and the output signal D1even or D1odd can have the same polarity.

Figure 5:
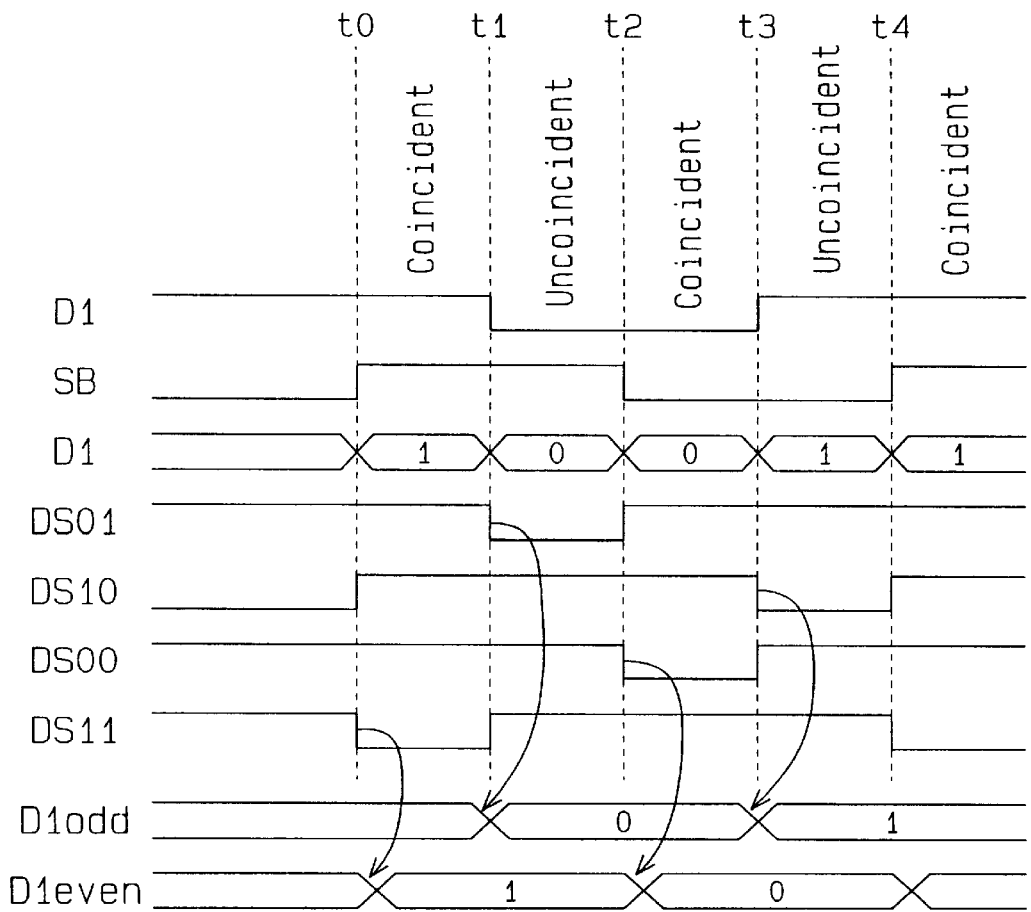
FIG. 5 is a time chart illustrating the operation of the data acquisition circuit in FIG. 4.

Referring now to FIG. 5, the operation of the data acquisition circuit 1 will now be discussed.

Suppose that after passage of time t0, the transfer data bit D1 is input to the data line L1 in the following order: "1", "0", "0", "1" and "1" as shown in FIG. 5. Therefore, the strobe signal SB corresponding to the transfer data bit D1 in such a sequence has logic values of "1", "1", "0", "0" and "1" in that order.

When the transfer data bit D1 of logic "1" is input following the transfer data bit D1 of logic "1" at time t0, the strobe signal SB is set to "1" from "0". In this case, the decoder 10 outputs the first coincident signal DS00 of an H level, the second coincident signal DS11 of an L level, the first uncoincident signal DS01 of an H level and the second uncoincident signal DS10 of an H level.

In response to the L-level second coincident signal DS11, the first SR element 11 performs a set operation and outputs the output signal D1even of logic "1". That is, the transfer data bit D1 of logic "1" at time t0 is output as the output signal D1even of logic "1" from the first SR element 11.

When the transfer data bit D1 changes to "0" from "1" at time t1, the strobe signal SB is held at logic "1". In this case, the decoder 10 outputs the first coincident signal DS00 of an H level, the second coincident signal DS11 of an H level, the first uncoincident signal DS01 of an L level and the second uncoincident signal DS10 of an H level.

In response to the L-level first uncoincident signal DS01, the second SR element 12 performs a reset operation and outputs the output signal D1odd of logic "0". That is, the transfer data bit D1 of logic "0" at time t1 is output as the output signal D1odd of logic "0" from the second SR element 12.

When the logic "0" of the transfer data bit D1 is held at time t2, the strobe signal SB changes to "0" from "1". In this case, the decoder 10 outputs the first coincident signal DS00 of an L level, the second coincident signal DS11 of an H level, the first uncoincident signal DS01 of an H level and the second uncoincident signal DS10 of an H level.

In response to the L-level first coincident signal DS00, the first SR element 11 performs a reset operation and outputs the output signal D1even of logic "0". That is, the transfer data bit D1 of logic "0" at time t2 is output as the output signal D1even of logic "0" from the first SR element 11.

When the transfer data bit D1 changes to "1" from "0", at time t3, the strobe signal SB is held at logic "1". The decoder 10 outputs the first coincident signal DS00 of an H level, the second coincident signal DS11 of an H level, the first uncoincident signal DS01 of an H level and the second uncoincident signal DS10 of an L level.

In response to the L-level second uncoincident signal DS10, the second SR element 12 performs a set operation and outputs the output signal D1odd of logic "1". That is, the transfer data bit D1 of logic "1" at time t3 is output as the output signal D1odd of logic "1" from the second SR element 12. The first and second SR elements 11 and 12 alternately output the output signals D1even and D1odd and acquire the transfer data bit D1 in this manner.

According to this embodiment, as the first and second SR elements 11 and 12 alternately execute a set or reset operation in accordance with the output signal from the decoder, the transfer data bit D1 is output from the first and second SR elements 11 and 12 as the output signals D1even and D1odd. In other words, every time the logic level of the transfer data bit D1 or the strobe signal SB is inverted, one of the first and second SR elements 11 and 12 carries out a set or reset operation to thereby output the output signals D1even and D1odd. Therefore, the data acquisition circuit 1 according to the first embodiment does not require a delay circuit, as discussed in the foregoing section of the related art, in order to secure the setup or hold time for the transfer data bit. The use of the data acquisition circuit 1 according to the first embodiment can thus accomplish fast transfer of the transfer data bit D1.

Second Embodiment

Figure 6:
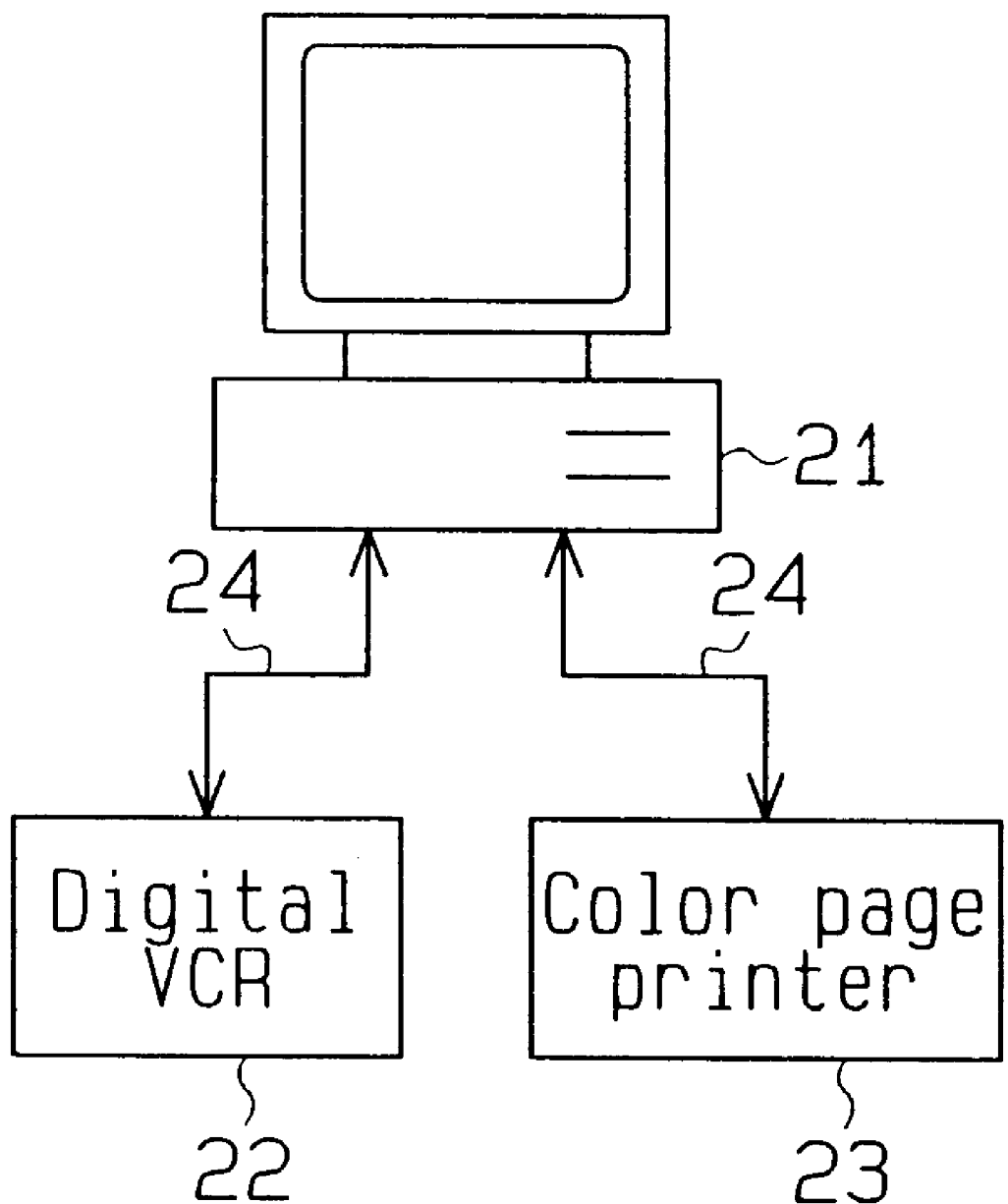
FIG. 6 is a block diagram of a system in which a personal computer and peripheral devices are connected by a bus which conforms to IEEE 1394.
Figure 7:
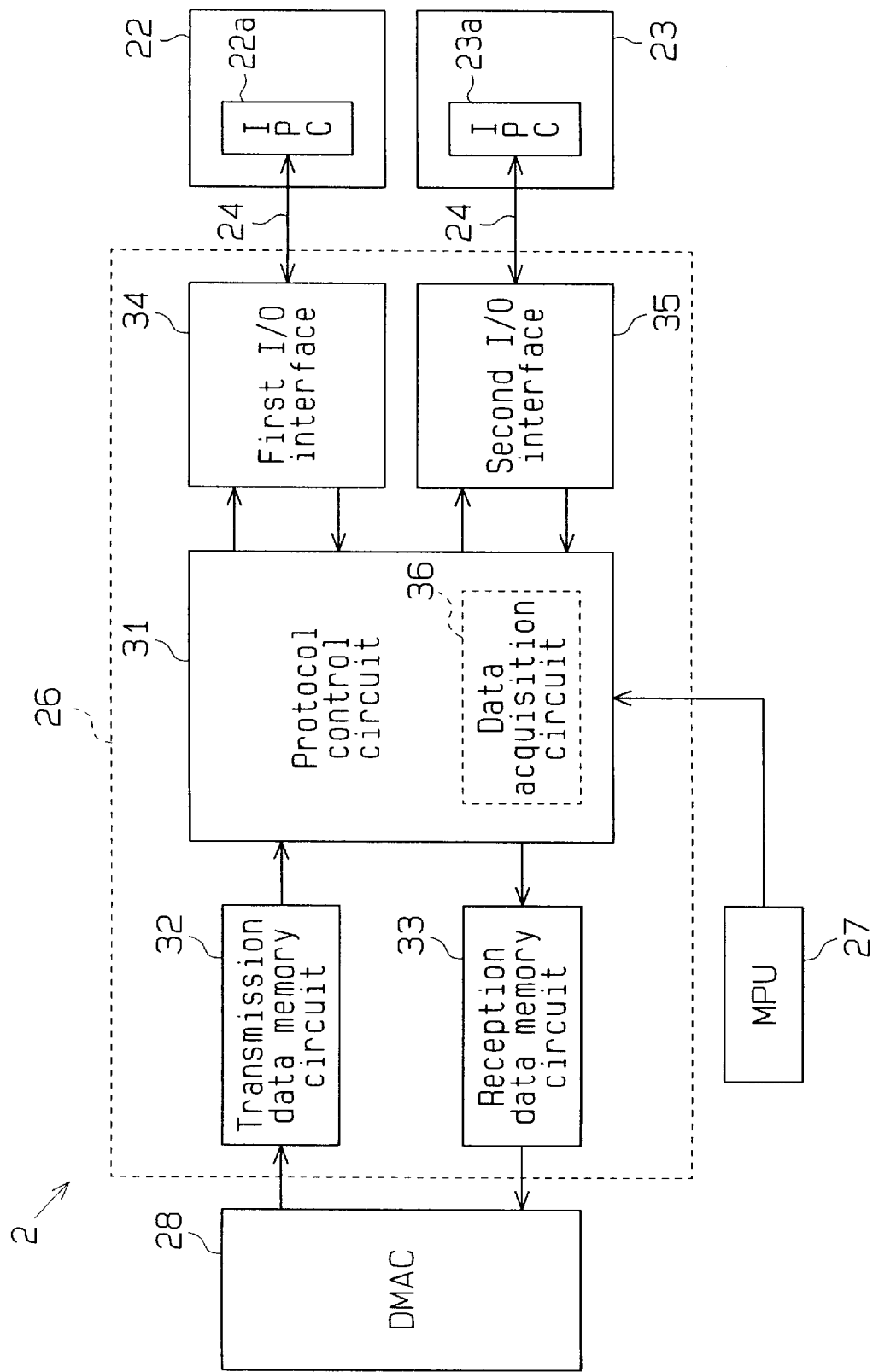
FIG. 7 is a schematic block diagram of a transfer unit of the present invention.

FIG. 6 shows a system which conforms to IEEE 1394. A computer 21, such as a personal computer, has a digital VCR 22 and a color printer 23 as peripheral devices, each of which is connected to the computer 21 by a bus 24 which conforms to IEEE 1394. FIG. 7 depicts a schematic block diagram of a transfer unit 2 incorporated in or connected to the computer 21, which conforms to IEEE 1394. The transfer unit 2 includes a protocol controller (IPC) 26, a microprocessor unit (MPU) 27 and a DMA (Direct Memory Access) controller (DMAC) 28 for IEEE 1394. Each of the IPC 26, MPU 27 and DMAC 28 comprises a single-chip semiconductor integrated circuit device (e.g,. LSI).

The IPC 26 is connected via the bus 24 to IPCs 22a and 23a, which are respectively incorporated in the digital VCR 22 and the color printer 23. The IPC 26 performs data exchange between the digital VCR 22 and the color printer 23 and the DMAC 28 under the control of the MPU 27. The IPC 26 includes a protocol control circuit 31, a transmission data memory circuit 32, a reception data memory circuit 33, a first input/output (I/O) interface 34 and a second I/O interface 35.

The first I/O interface 34, connected to the IPC 22a of the digital VCR 22 via the bus 24, exchanges the transfer data bit D1 and the strobe signal SB between the protocol control circuit 31 and the IPC 22a. The second I/O interface 35, connected to the IPC 23a of the color printer 23 via the bus 24, exchanges the transfer data bit D1 and the strobe signal SB between the protocol control circuit 31 and the IPC 23a.

The exchange of the transfer data bit D1 is performed in accordance with the DS link system using the strobe signal SB. That is, every time the transfer data bit D1 is transferred in a regular period, the strobe signal SB is generated in such a manner that coincidence and uncoincidence between both logic levels of the transfer data bit D1 and the strobe signal SB are alternately repeated.

The transmission data memory circuit 32, connected between the protocol control circuit 31 and the DMAC 28, receives the transmission transfer data bit D1 from the DMAC 28 and temporarily retains it. The transmission transfer data bit D1 is then supplied to the protocol control circuit 31.

The reception data memory circuit 33, also connected between the protocol control circuit 31 and the DMAC 28, receives the reception transfer data bit D1 from the protocol control circuit 31 and temporarily retains it. The reception transfer data bit D1 is then supplied to the DMAC 28.

The protocol control circuit 31 exchanges control data with the MPU 27 and analyzes whether or not the transfer data bit D1 from the first or second I/O interface 34 or 35 should be supplied to the computer 21. When the transfer data bit D1 is to be supplied to the computer 21, the protocol control circuit 31 sends the reception transfer data bit D1 to the reception data memory circuit 33 in accordance with the control data from the MPU 27.

The protocol control circuit 31 receives the transmission transfer data bit D1 from the DMAC 28, stored in the transmission data memory circuit 32, in accordance with the control data from the MPU 27. The protocol control circuit 31 affixes a header to the transmission transfer data bit D1 and supplies the resultant transfer data bit D1 to the first and second I/O interfaces 34 and 35.

The protocol control circuit 31 has a data acquisition circuit 36 according to the second embodiment of the present invention. The data acquisition circuit 36 receives the serial transfer data bit DI from the digital VCR 22 or the color printer 23 via the first or second I/O interface 34 or 35, and acquires the transfer data bit D1 using the strobe signal SB. The data acquisition circuit 36 of the second embodiment may be used for data transfer according to the DS link system, instead of being incorporated in the protocol control circuit 31. That is, the data acquisition circuit 36 may be comprise a single chip semiconductor integrated circuit device.

Figure 8:
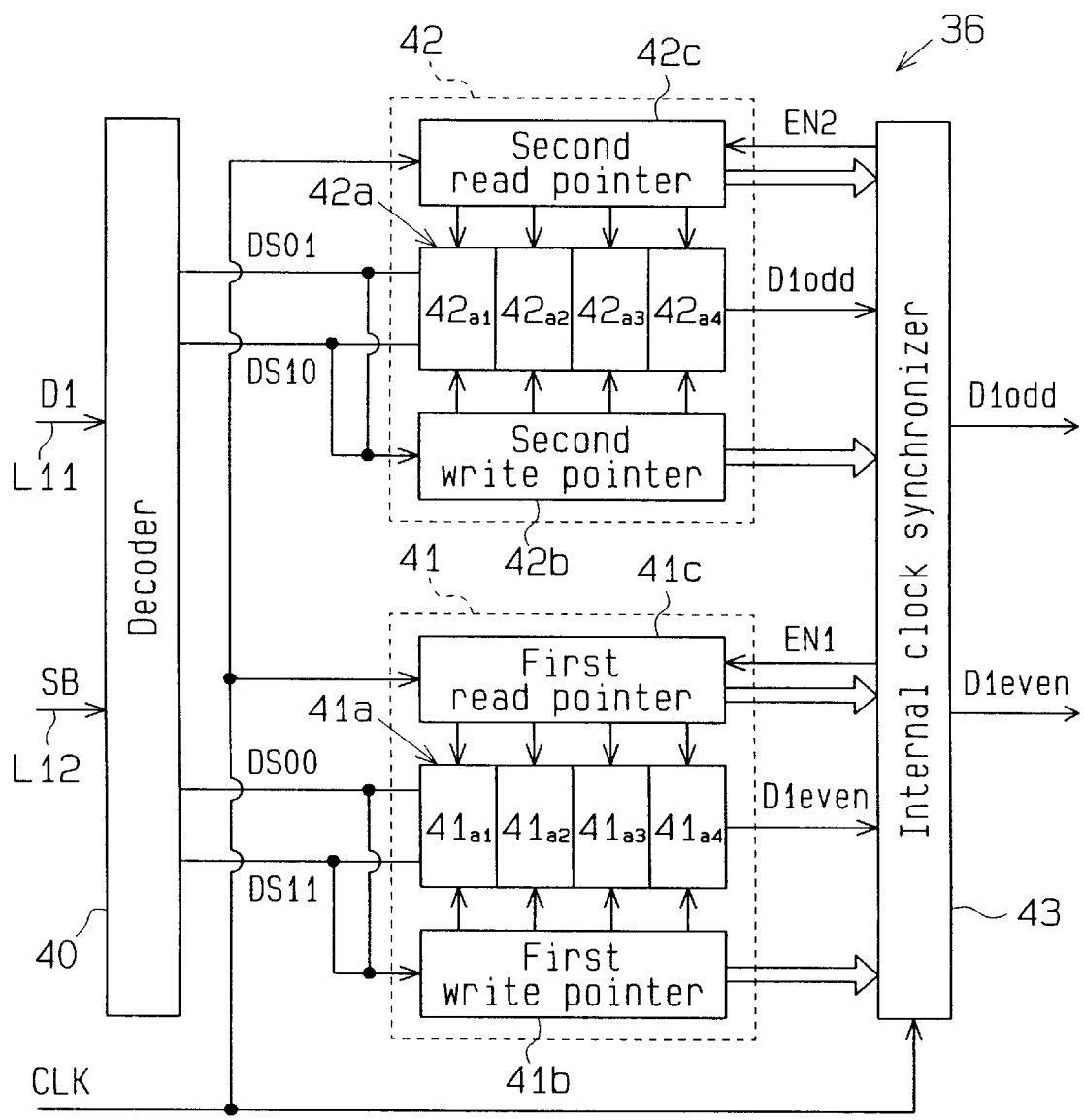
FIG. 8 is a schematic block diagram of a data acquisition circuit, provided in a protocol control circuit in a transfer unit, according to a second embodiment of the present invention.

As shown in FIG. 8, the data acquisition circuit 36 includes a decoder 40, a first set-reset (SR) circuit 41, a second set-reset (SR) circuit 42 and an internal clock synchronizer 43. The decoder 40 receives the transfer data bit D1 and strobe signal SB, supplied from the digital VCR 22 and the color printer 23, via a data line L11 and a strobe line L12 in accordance with the DS link system. The decoder 40 outputs a first coincident signal DS00, a second coincident signal DS11, a first uncoincident signal DS01 and a second uncoincident signal DS10 each having an L level or an H level as follows.

(A) When the transfer data bit D1 is "0" and the strobe signal SB is "0", the first coincident signal DS00 has an L level, the second coincident signal DS11 has an H level, the first uncoincident signal DS01 has an H level, and the second uncoincident signal DS10 has an H level.

(B) When the transfer data bit D1 is "0" and the strobe signal SB is "1", the first coincident signal DS00 has an H level, the second coincident signal DS11 has an H level, the first uncoincident signal DS01 has an L level, and the second uncoincident signal DS10 has an H level.

(C) When the transfer data bit D1 is "1" and the strobe signal SB is "0",
   the first coincident signal DS00 has an H level,
   the second coincident signal DS11 has an H level,
   the first uncoincident signal DS01 has an H level, and
   the second uncoincident signal DS10 has an L level.

(D) When the transfer data bit D1 is "1" and the strobe signal SB is "1",
   the first coincident signal DS00 has an H level,
   the second coincident signal DS11 has an L level,
   the first uncoincident signal DS01 has an H level, and
   the second uncoincident signal DS10 has an H level.

The first SR circuit 41 includes a memory circuit 41a, a first write pointer 41b and a first read pointer 41c. The memory circuit 41a, which is a readable and writeable type, includes four (first to fourth) set-reset (SR) elements 41a1 to 41a4. Each of the first to fourth SR elements 41a1 to 41a4 has a set input terminal for receiving the second coincident signal DS11, and a reset input terminal for receiving the first coincident signal DS00. Each of the first to fourth SR elements 41a1 to 41a4 performs a set operation and outputs a logic "1" from its output terminal in response to the L-level second coincident signal DS11 input to the set input terminal. In response to the L-level first coincident signal DS00 input to the reset input terminal, each of the first to fourth SR elements 41a1 to 41a4 performs a reset operation and outputs a logic "0" from its output terminal. The first to fourth SR elements 41a1 to 41a4 preferably comprise RS flip-flops. The number of the SR elements in the memory circuit 41a is not limited to four, but may be changed to 100, 1000 or any other number, as needed.

The first write pointer 41b is a writing address counter and generates an address to specify one of the first to fourth SR elements 41a1 to 41a4. The one element that is designated by the address receives the L-level first or second coincident signal DS00 or DS11. Specifically, the first write pointer 41b increments the count value every time the first or second coincident signal DS00 or DS11 rises to the H level from the L level and repeat counting from "0" to "3". With the count value being "3", therefore, when the first or second coincident signal DS00 or DS11 rises to the H level from the L level, the count value is set to "0".

According to the second embodiment, the first SR element 41a1 is specified (i.e. addressed by the first write pointer 41b) when count value of the first write pointer 41b is "0". The second SR element 41a2 is specified when the count value is "1", the third SR element 41a3 is specified when the count value is "2", and the fourth SR element 41a4 is specified when the count value is "3".

The first read pointer 41c is a reading address counter and generates a read address to specify one of the first to fourth SR elements 41a1 to 41a4. The one element that is designated by the read address outputs the retained logic value from the output terminal. Specifically, the first read pointer 41c is enabled by a first enable signal EN1, increments the count value every time an internal clock CLK rises and repeats counting from "0" to "3". The internal clock CLK is a clock signal which is output from a system clock generator (not shown) in the MPU 27. According to the second embodiment, as in the case of the first write pointer 41b, one of the first to fourth SR elements 41a1 to 41a4 is specified in accordance with the count value of the first read pointer 41c. In this manner, the memory circuit 41a serves as a FIFO (First In First Out) type memory which outputs the output signal D1even while shifting the write and read addresses in accordance with both count values of the first write and read pointers 41b and 41c.

The second SR circuit 42 includes a memory circuit 42a, a second write pointer 42b and a second read pointer 42c. The memory circuit 42a, which is a readable and writeable type, includes four (fifth to eighth) set-reset (SR) elements 42a1 to 42a4. Each of the fifth to eighth SR elements 42a1 to 42a4 has a set input terminal for receiving the second uncoincident signal DS10, and a reset input terminal for receiving the first uncoincident signal DS01. Each of the fifth to eighth SR elements 42a1 to 42a4 performs a set operation and outputs a logic "1" from its output terminal in response to the L-level second uncoincident signal DS10 input to the set input terminal. In response to the L-level first uncoincident signal DS01 input to the reset input terminal, each of the fifth to eighth SR elements 42a1 to 42a4 performs a reset operation and outputs a logic "0" from its output terminal. The fifth to eighth SR elements 42a1 to 42a4 preferably comprise RS flip-flops. The number of the SR elements in the memory circuit 42a is not limited to four, but may be changed to 100, 1000 or any other number, as needed.

The second write pointer 42b is a writing address counter and generates an address to specify one of the fifth to eighth SR elements 42a1 to 42a4. The one element that is designated by the address receives the L-level first or second uncoincident signal DS01 or DS10. Specifically, the second write pointer 42b increments the count value every time the first or second uncoincident signal DS01 or DS10 rises to the H level from the L level and repeats counting from "0" to "3". According to the second embodiment, the fifth SR element 42a1 is specified when the count value of the second write pointer 42b is "0", the sixth SR element 42a2 is specified when the count value is "1", the seventh SR element 42a3 is specified when the count value is "2", and the eighth SR element 42a4 is specified when the count value is "3".

The second read pointer 42c is a reading address counter and generates an address to specify one of the fifth to eighth SR elements 42a1 to 42a4. The designated one element outputs the retained logic value from the output terminal. The second read pointer 42c, when enabled by a second enable signal EN2, increments the count value every time the internal clock CLK rises and repeats counting from "0" to "3". According to the second embodiment, as in the case of the second write pointer 42b, one of the fifth to eighth SR elements 42a1 to 42a4 is specified in accordance with the count value of the second read pointer 42c. In this manner, the memory circuit 42a serves as a FIFO type memory which outputs the output signal D1odd while shifting the write and read addresses in accordance with both count values of the second write and read pointers 42b and 42c.

The internal clock synchronizer 43 receives addresses from the first write and read pointers 41b and 41c, based on whether the memory circuit 41a is full or empty. Based on the status of the memory circuit 41a, the internal clock synchronizer 43 controls the reading of the output signal D1even from the output terminal of one of the first to fourth SR elements 41a1 to 41a4. That is, when reading of the output signal D1even from the memory circuit 41a is enabled, the internal clock synchronizer 43 enables the first enable signal EN1 supplied to the first read pointer 41c.

The internal clock synchronizer 43 also receives addresses from the second write and read pointers 42b and 42c, based on whether the memory circuit 42a is full or empty. Based on the status of the memory circuit 42a, the internal clock synchronizer 43 controls the reading of the output signal D1odd from the output terminal of one of the fifth to eighth SR elements 42a1 to 42a4. That is, when reading of the output signal D1odd from the memory circuit 42a is enabled, the internal clock synchronizer 43 enables the second enable signal EN2 supplied to the second read pointer 42c.

In synchronism with the internal clock CLK, the internal clock synchronizer 43 receives the output signals D1even and D1odd from the first and second SR circuits 41 and 42, and alternately supplies the output signals D1even and D1odd to other circuits (not shown) in the protocol control circuit 31.

The operation of the above-described data acquisition circuit 36 will be discussed below. For easier understanding of the explanation, it is assumed that the transfer data bit D1 and strobe signal SB change at individual times t0 to t8 as shown in FIG. 9.

Figure 9:
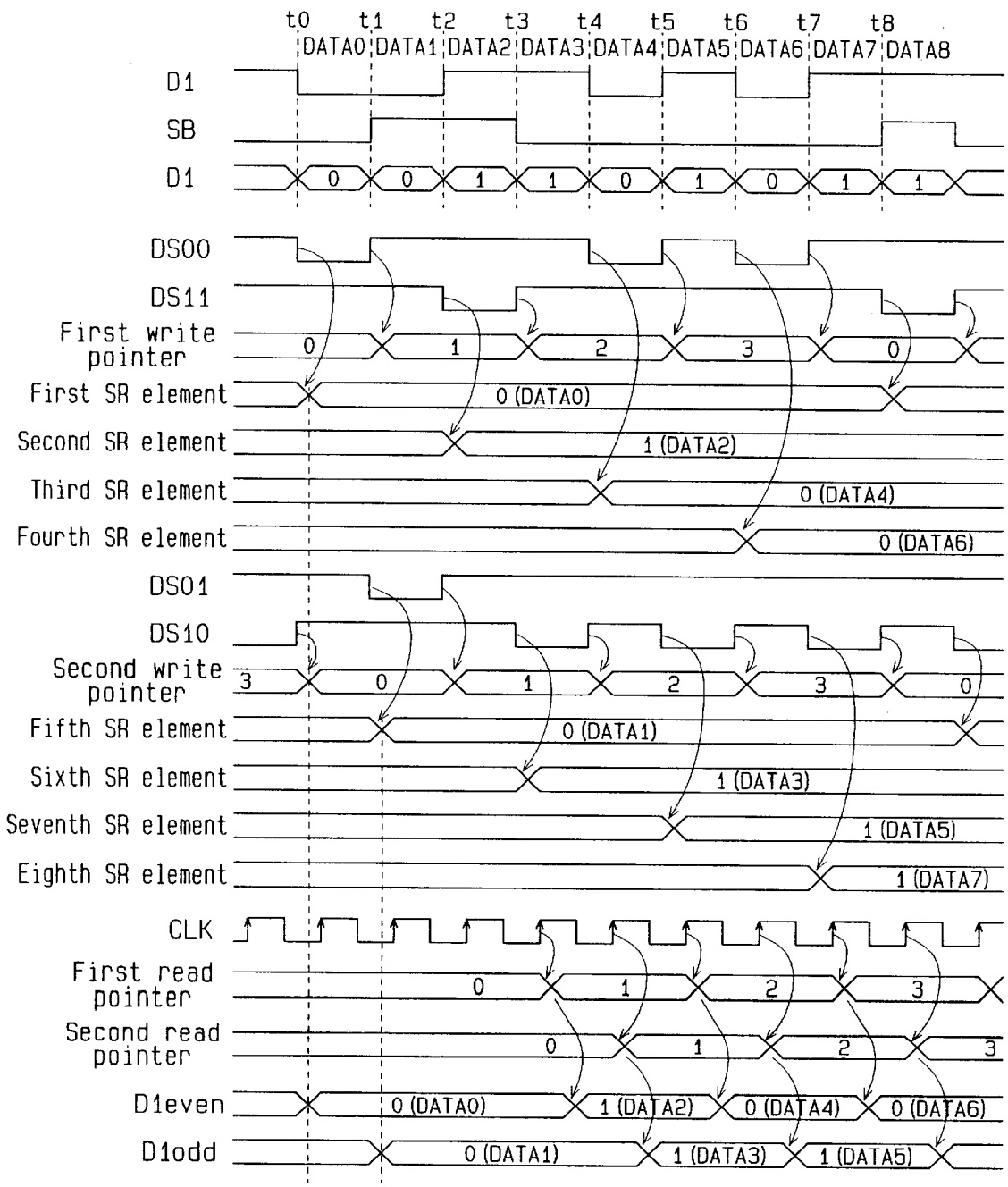
FIG. 9 is a time chart illustrating the operation of the data acquisition circuit in FIG. 8.

Referring now to FIG. 9, the decoder 40 outputs
the L-level first coincident signal DS00 at time t0,
the L-level first uncoincident signal DS01 at time t1,
the L-level second coincident signal DS11 at time t2,
the L-level second uncoincident signal DS10 at time t3,
the L-level first coincident signal DS00 at time t4,
the L-level second uncoincident signal DS10 at time t5,
the L-level first coincident signal DS00 at time t6,
the L-level second uncoincident signal DS10 at time t7, and
the L-level second coincident signal DS11 at time t8.
Further, the count values of the write pointers 41b and 42b at time t0 are "0".

At time t0, the L-level first coincident signal DS00 supplied to the first SR circuit 41 from the decoder 40 is supplied to the reset input terminal of the first SR element 41a1 designated by the count value "0" of the first write pointer 41b. As a result, the first SR element 41a1 performs a reset operation and outputs a logic "0" from the output terminal.

At time t1, the L-level first uncoincident signal DS01 supplied to the second SR circuit 42 from the decoder 40 is supplied to the reset input terminal of the fifth SR element 42a1 which is designated according to the count value "0" of the second write pointer 42b. Consequently, the fifth SR element 42a1 performs a reset operation and outputs a logic "0" from the output terminal. At time t1, the first write pointer 41b sets the count value to "1" in response to the rising of the first coincident signal DS00 to the H level from the L level.

At time t2, the L-level second coincident signal DS11 is supplied to the set input terminal of the second SR element 41a2 which is designated in accordance with the count value "1" of the first write pointer 41b. As a result, the second SR element 41a2 performs a set operation and outputs a logic "1" from the output terminal. At time t2, the second write pointer 42b sets the count value to "1" in response to the rising of the first uncoincident signal DS01.

At time t3, the L-level second uncoincident signal DS10 is supplied to the set input terminal of the sixth SR element 42a2 which is designated in accordance with the count value "1" of the second write pointer 42b. Accordingly, the sixth SR element 42a2 performs a set operation and outputs a logic "1" from the output terminal. At time t3, the first write pointer 41b sets the count value to "2" in response to the rising of the second coincident signal DS11.

At time t4, the L-level first coincident signal DS00 is supplied to the reset input terminal of the third SR element 41a3 which is designated according to the count value "2" of the first write pointer 41b. As a result, the third SR element 41a3 performs a reset operation and outputs a logic "0" from the output terminal. At time t4, the second write pointer 42b sets the count value to "2" in response to the rising of the second uncoincident signal DS10.

Thereafter, one of the coincident and uncoincident signals DS00, DS11, DS01 and DS10 which has an L level is supplied to the associated SR element that is specified in accordance with the count value of the first or the second write pointer 41b or 42b. Accordingly, the designated SR element performs a set or reset operation and the transfer data bit D1 at that time is held. That is, the transfer data bit D1 is sequentially distributed to the individual SR elements of the first and second SR elements 41 and 42.

A description will now be given of a read operation, which is carried out in accordance with the internal clock CLK and the first and second enable signals EN1 and EN2 from the internal clock synchronizer 43. For easier understanding of the explanation, it is assumed that the count values of the first and second read pointers 41c and 42c are set to "0" at time t0. It is also presumed that the first and second enable signals EN1 and EN2 output from the internal clock synchronizer 43 are not enabled from time t0 to time t3. Therefore, the first and second read pointers 41c and 42c do not increment their count values in response to the rising of the internal clock CLK.

At time t0, the first SR element 41a1 is specified according to the count value "0" of the first read pointer 41c. The output of logic "0" from the specified first SR element 41a1 is supplied as the output signal D1even to the internal clock synchronizer 43. The output of the output signal D1even of "0" from the first SR element 41a1 continues to time t3 at which the count value of the first read pointer 41c is set to "1" as shown in FIG. 9.

At time t1, the fifth SR element 42a1 is specified according to the count value "0" of the second read pointer 42c. The output of logic "0" from the specified fifth SR element 42a1 is supplied as the output signal D1odd to the internal clock synchronizer 43.

After time t3, the first read pointer 41c is enabled by the first enable signal EN1. The first read pointer 41c set the count value to "1" in response to the rising of the first internal clock CLK after time t3. As a result, the second SR element 41a2 is specified in accordance with the count value "1" of the first read pointer 41c. The output of logic "1" from the specified second SR element 41a2 is supplied as the output signal D1even to the internal clock synchronizer 43. The internal clock synchronizer 43 disables the first enable signal EN1 after the count value of the first read pointer 41c is set to "1". The first enable signal EN1 is enabled after the internal clock CLK falls to the L level. The internal clock synchronizer 43 repeats enabling and disabling the first enable signal EN1 in such a cycle.

After time t4, the second read pointer 42c is enabled by the second enable signal EN2. The second read pointer 42c sets the count value to "1" in response to the rising of the first internal clock CLK after time t4. As a result, the sixth SR element 42a2 is specified in accordance with the count value "1" of the second read pointer 42c. The output of logic "1" from the specified sixth SR element 42a2 is supplied as the output signal D1odd to the internal clock synchronizer 43. The internal clock synchronizer 43 disables the second enable signal EN2 after the count value of the second read pointer 42c is set to "1". The second enable signal EN2 is enabled again after the internal clock CLK falls to the L level. The internal clock synchronizer 43 repeats enabling and disabling the second enable signal EN2 in such a cycle.

As apparent from the above, the first and second read pointers 41c and 42c alternately increment their count values to sequentially specify the SR elements, so that the output signals D1even and D1odd from the first and second SR circuit 41 and 42 are alternately supplied to the internal clock synchronizer 43. The internal clock synchronizer 43 supplies the transfer data bit D1 as the output signal D1even or D1odd to the internal circuits (not shown) in the protocol control circuit 31 in synchronism with the internal clock CLK. According to the second embodiment, therefore, it is unnecessary to use a delay circuit in order to secure the setup time or hold time for the transfer data bit, which ensures fast transfer of the transfer data bit D1 in the protocol controller (IPC) 26. Further, the relatively simple design of the data acquisition circuit 36 leads to cost reduction, as well as easier design modification.

Furthermore, the SR element 41a or 42a specified in accordance with the count value of the first or second write pointer 41b or 42b holds the transfer data bit D1.

The SR element 41a or 41b specified in accordance with the count value of the first or second read pointer 41c or 42c outputs the retained transfer data bit D1. The data bit D1 output is controlled by the first and second enable signals EN1 and EN2 from the internal clock synchronizer 43. The first and second enable signals EN1 and EN2 are enabled in accordance with the clock signal CLK. Even when the processing speeds (transfer speeds) of the digital VCR 22 and the color printer 23 are faster than that of the computer 21, transfer data can be acquired in accordance with the processing speed of the computer 21.

The first write pointer 41b (second write pointer 42b) increments the count value in synchronism with the rising of the first or second coincident signal DS00 or DS11 (first or second uncoincident signal DS01 or DS10). Therefore, the specified SR element 41a, 42a can execute the set or reset operation in synchronism with the falling of the first or second coincident signal DS00 or DS11 (first or second uncoincident signal DS01 or DS10).

The first read pointer 41c (second read pointer 42c) increments the count value in accordance with the internal clock CLK and the first enable signal EN1 (second enable signal EN2). It is thus possible to carry out the set or reset operation to read data in synchronism with the clock signal.

The internal clock synchronizer 43 may be designed as follows. The internal clock synchronizer 43 supplies the first enable signal EN1 to the first read pointer 41c when the count value of the first write pointer 41b is greater by, for example, "2" or more than the count value of the first read pointer 41c. Further, the internal clock synchronizer 43 supplies the second enable signal EN2 to the second read pointer 42c when the count value of the second write pointer 42b is greater by, for example, "2" or more than the count value of the second read pointer 42c. While enabled by the first enable signal EN1 (second enable signal EN2), the first read pointer 41c (second read pointer 42c) increments its count value in accordance with the internal clock CLK. Thus, the internal clock synchronizer 43 allows data to be efficiently read from the memory circuit 41a or 42a.

It should be apparent to those skilled in the art that the present invention may be embodied in many other specific forms without departing from the spirit or scope of the invention.

Figure 10:
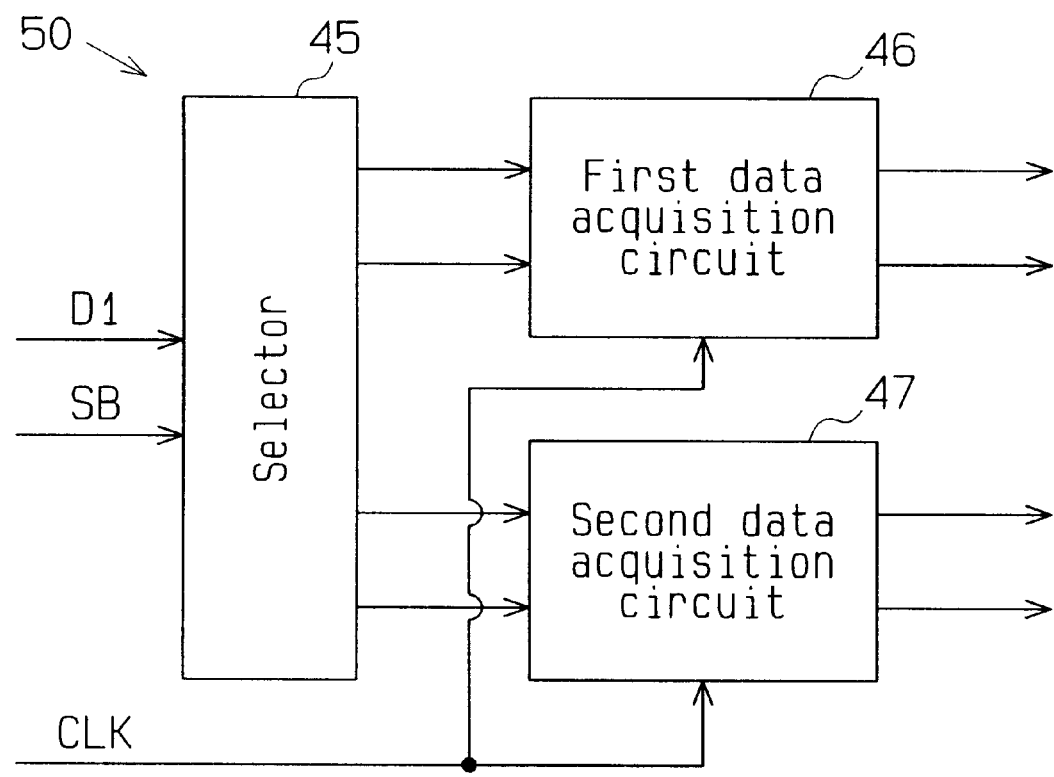
FIG. 10 is a schematic block diagram of a data acquisition circuit according to a further embodiment of the present invention.

For example, as shown in FIG. 10, a data acquisition circuit 50 according to a further embodiment of the present invention includes first and second data acquisition circuits 46 and 47 and a selector 45. Each of the first and second data acquisition circuits 46 and 47 is the same as the data acquisition circuit 36 of the second embodiment (FIG. 8). The selector 45 receives the transfer data bit D1 and strobe signal SB and selectively distributes the transfer data bit D1 and strobe signal SB to the first and second data acquisition circuits 46 and 47. For example, the transfer data bit D1 and strobe signal SB are supplied to the first data acquisition circuit 46 at times t0, t1, t4, t5 and so forth in FIG. 9, and are supplied to the second data acquisition circuit 47 at times t2, t3, t6, t7 and so forth. The data acquisition circuit 50 permits parallel data acquisition, thus ensuring faster data transfer. The number of the data acquisition circuits may be set greater than two. Further, a plurality of data acquisition circuits of the type of the first embodiment may be used.

Therefore, the present examples and embodiments are to be considered as illustrative and not restrictive and the invention is not to be limited to the details given herein, but may be modified within the scope and equivalence of the appended claims.

What is claimed is:

1. A data acquisition circuit for acquiring transfer data having first and second logical values using a strobe signal having first and second logical values, said transfer data and said strobe signal being arranged such that coincidence and uncoincidence of said first and second logical values thereof are alternately repeated, said data acquisition circuit comprising:

a decoder for determining a coincidence and an uncoincidence between said transfer data and said strobe signal, wherein when there is a coincidence, said decoder outputs a first or second discrimination signal, said first discrimination signal indicating coincidence between said first logical values of said transfer data and strobe signals, said second discrimination signal indicating coincidence between said second logical values of said transfer data and strobe signals, when there is an uncoincidence, said decoder further outputting a third or fourth discrimination signal, said third discrimination signal indicating uncoincidence between said first logical value of said transfer data and said second logical value of said strobe signal, said fourth discrimination signal indicating uncoincidence between said second logical value of said transfer data and said first logical value of said strobe signal;

a first element, connected to said decoder, for outputting a signal having said first logical value in response to said first discrimination signal and for outputting a signal having said second logical value in response to said second discrimination signal; and a second element, connected to said decoder, for outputting a signal having said first logical value in response to said third discrimination signal and for outputting a signal having said second logical value in response to said fourth discrimination signal.

2. The data acquisition circuit according to claim 1, wherein said transfer data is transferred serially.

3. The data acquisition circuit according to claim 1, wherein said transfer data and said strobe signal are arranged such that a coincident state and an uncoincident state are periodically alternately repeated.

4. The data acquisition circuit according to claim 1, wherein each of said first and second elements comprises an RS-type flip-flop.

5. A data acquisition circuit for acquiring transfer data having first and second logical values using a strobe signal having first and second logical values, said transfer data and said strobe signal being arranged such that coincidence and uncoincidence of said first logical values or second logical values thereof are alternately repeated, said data acquisition circuit comprising:

a decoder for determining a coincidence and uncoincidence between said transfer data and said strobe signal, wherein when there is a coincidence, said decoder outputting a first discrimination signal or a second discrimination signal, said first discrimination signal indicating coincidence between said first logical values of said transfer data and said strobe signal, said second discrimination signal indicating coincidence between said second logical values of said transfer data and said strobe signal, when there is an uncoincidence, said decoder further outputting a third discrimination signal or a fourth discrimination signal, said third discrimination signal indicating uncoincidence between said first logical value of said transfer data and said second logical value of said strobe signal, said fourth discrimination signal indicating uncoincidence between said second logical value of said transfer data and said first logical value of said strobe signal;

a plurality of first elements, connected to said decoder, for outputting a signal having said first logical value in response to said first discrimination signal and for outputting a signal having said second logical value in response to said second discrimination signal;

a plurality of second elements, connected to said decoder, for outputting a signal having said first logical value in response to said third discrimination signal and for outputting a signal having said second logical value in response to said fourth discrimination signal;

a first write pointer, connected to said plurality of first elements, for selectively enabling one of said first elements;

a first read pointer, connected to said plurality of first elements, for selectively enabling one of said first elements to output a signal having one of said first and second logical values;

a second write pointer, connected to said plurality of second elements, for selectively enabling one of said second elements; and a second read pointer, connected to said plurality of second elements, for selectively enabling one of said second elements to output a signal having one of said first and second logical values.

6. The data acquisition circuit according to claim 5, wherein said first write pointer receives said first and second discrimination signals from said decoder and counts a reception number of said first and second discrimination signal to selectively enable one of said first elements;

said first read pointer counts a reception number of said first elements and selectively enable one of said first elements;

said second write pointer receives said third and fourth discrimination signals from said decoder and counts a reception number of said third and fourth discrimination signals to selectively enable one of said second elements; and said second read pointer counts a reception number of said second elements and selectively enable one of said second elements.

7. The data acquisition circuit according to claim 5, wherein said first write pointer receives said first and second discrimination signals from said decoder and counts a reception number of said first and second discrimination signals to selectively enable one of said first elements;

said first read pointer receives a clock signal having a predetermined period and performs, in response to the clock signal, a counting operation to selectively enable one of said first elements;

said second write pointer receives said third and fourth discrimination signals from said decoder and counts a reception number of said third and fourth discrimination signals to selectively enable one of said second elements; and said second read pointer receives the clock signal and performs, in response to the clock signal, a counting operation to selectively enable one of said second elements.

8. The data acquisition circuit according to claim 5, further comprising a clock synchronizer circuit, coupled to said first and second elements, for receiving the signals from said first and second elements to selectively output the signals in synchronism with the clock signal.

9. The data acquisition circuit according to claim 5, wherein said clock synchronizer circuit is also coupled to said first and second read pointers and selectively enables said first and second read pointers in accordance with the clock signal.

10. The data acquisition circuit according to claim 5, wherein said transfer data is transferred serially.

11. The data acquisition circuit according to claim 5, wherein said transfer data and said strobe signal are arranged such that a coincident state and an uncoincident state are alternately periodically repeated.

12. The data acquisition circuit according to claim 5, wherein each of said first and second elements comprises an RS-type flip-flop.

13. A protocol controller for implementing IEEE 1394 compatible data acquisition, the controller comprising:

a protocol controller circuit having a data acquisition circuit for acquiring transfer data having first and second logical values using a strobe signal having first and second logical values, said transfer data and said strobe signal being arranged such that coincidence and uncoincidence of said first logical values and second logical values thereof are alternately repeated, said data acquisition circuit including:

a decoder for determining a coincidence and an uncoincidence between said transfer data and said strobe signal, wherein when there is a coincidence, said decoder outputs a first or second discrimination signal, said first discrimination signal indicating coincidence between said first logical values of said transfer and strobe signals, said second discrimination signal indicating coincidence between said second logical values of said transfer and strobe signals, when there is an uncoincidence, said decoder further outputting a third or fourth discrimination signal, said third discrimination signal indicating uncoincidence between said first logical value of said transfer data and said second logical value of said strobe signal, said fourth discrimination signal indicating uncoincidence between said second logical value of said transfer data and said first logical value of said strobe signal;

a first element, connected to said decoder, for outputting a signal having said first logical value in response to said first discrimination signal and for outputting a signal having said second logical value in response to said second discrimination signal; and a second element, connected to said decoder, for outputting a signal having said first logical value in response to said third discrimination signal and for outputting a signal having said second logical value in response to said fourth discrimination signal.

14. The protocol controller according to claim 13, further comprising:

a transmission data memory circuit coupled to said protocol controller circuit;

a reception data memory circuit coupled to said protocol controller circuit; and an input/output interface coupled to said protocol controller circuit.

15. A protocol controller for performing IEEE 1394 data transfers conforming to the controller, the controller comprising:

a protocol controller circuit having a data acquisition circuit for acquiring transfer data having first and second logical values using a strobe signal having first and second logical value, said transfer data and said strobe signal being arranged such that coincidence and uncoincidence of said first logical values and second logical values thereof are alternately repeated, said data acquisition circuit including:

a decoder for determining a coincidence and an uncoincidence between said transfer data and said strobe signal, wherein when there is a coincidence, said decoder outputs a first discrimination signal or a second discrimination signal, said first discrimination signal indicating coincidence between said first logical values of said transfer data and said strobe signal, said second discrimination signal indicating coincidence between said second logical values of said transfer data and said strobe signal, when there is an uncoincidence, said decoder further outputting a third discrimination signal or a fourth discrimination signal, said third discrimination signal indicating uncoincidence between said first logical value of said transfer data and said second logical value of said strobe signal, said fourth discrimination signal indicating uncoincidence between said second logical value of said transfer data and said first logical value of said strobe signal;

a plurality of first elements, connected to said decoder, for outputting a signal having said first logical value in response to said first discrimination signal and for outputting a signal having said second logical value in response to said second discrimination signal;

a plurality of second elements, connected to said decoder, for outputting a signal having said first logical value in response to said third discrimination signal and for outputting a signal having said second logical value in response to said fourth discrimination signal;

a first write pointer, connected to said plurality of first elements, for selectively enabling one of said first elements;

a first read pointer, connected to said plurality of first elements, for selectively enabling one of said first elements to output a signal having one of said first and second logical values;

a second write pointer, connected to said plurality of second elements, for selectively enabling one of said second elements; and a second read pointer, connected to said plurality of second elements, for selectively enabling one of said second elements to output a signal having one of said first and second logical values.

16. The protocol controller according to claim 15, further comprising:

a transmission data memory circuit coupled to said protocol controller circuit;

a reception data memory circuit coupled to said protocol controller circuit; and an input/output interface coupled to said protocol controller circuit.

17. A data acquisition method for acquiring transfer data using a strobe signal, said transfer data and said strobe signal being arranged such that coincidence and uncoincidence of first and second logical values thereof are alternately repeated, said method comprising the steps of:

(a) determining a coincidence and an uncoincidence between said transfer data and said strobe signal, (b) generating first and second discrimination signals when there is a coincidence, said first discrimination signal indicating coincidence between said first logical values of said transfer data and strobe signal, said second discrimination signal indicating coincidence between said second logical values of said transfer data and strobe signal, (c) generating third and fourth discrimination signals when there is an uncoincidence, said third discrimination signal indicating uncoincidence between said first logical value of said transfer data and said second logical value of said strobe signal, said fourth discrimination signal indicating uncoincidence between said second logical value of said transfer data and said first logical value of said strobe signal;

(d) generating a signal having said first logical value in response to said first discrimination signal;

(e) generating a signal having said second logical value in response to said second discrimination signal;

(f) generating a signal having said first logical value in response to said third discrimination signal;

(g) generating a signal having said second logical value in response to said fourth discrimination signal.

18. The data acquisition method according to claim 17, wherein said transfer data is transferred serially.

19. The data acquisition method according to claim 17, wherein said transfer data and said strobe signal are arranged such that a coincident state and an uncoincident state are periodically alternately repeated.

20. A data acquisition method for acquiring transfer data using a strobe signal, said transfer data and said strobe signal being arranged such that coincidence and uncoincidence of first and second logical values thereof are alternately repeated, said data acquisition method comprising the steps of:

(a) determining a coincidence and an uncoincidence between said transfer data and said strobe signal;

(b) generating a first discrimination signal and a second discrimination signal when there is a coincidence, said first discrimination signal indicating coincidence between said first logical values of said transfer data and said strobe signal, a second discrimination signal indicating coincidence between said second logical values of said transfer data and said strobe signal;

(c) generating a third discrimination signal and a fourth discrimination signal when there is an uncoincidence, said third discrimination signal indicating uncoincidence between said first logical value of said transfer data and said second logical value of said strobe signal, said fourth discrimination signal indicating uncoincidence between said second logical value of said transfer data and said first logical value of said strobe signal;

(d) generating a first plurality of signals, each having said first logical value, in response to said first discrimination signal using a respective plurality of first elements;

(e) generating a second plurality of signals, each having said second logical value, in response to said second discrimination signal using the plurality of first elements;

(f) selectively enabling one of the first elements to generate an output signal having one of said first and second logical values;

(g) selectively enabling one of the first elements to output the signal having one of said first and second logical values;

(h) generating a third plurality of signals, each having said first logical value, in response to said third discrimination signal using a respective plurality of second elements;

(i) generating a fourth plurality of signals, each having said second logical value, in response to said fourth discrimination signal using the plurality of second elements;

(j) selectively enabling one of the plurality of second elements to generate an output signal having one of said first and second logical values; and (k) selectively enabling one of the plurality of second elements to output the output signal having one of said first and second logical values.

21. The data acquisition method according to claim 20, wherein said step (f) includes the step of selectively enabling one of the plurality of first elements to generate the output signal by counting a generation number of said first and second discrimination signals, said step (g) includes the step of selectively enabling one of the first elements to output the output signal by counting a selection number of the first elements;

said step (j) includes the step of selectively enabling one of the second elements to generate the output signal by counting a generation number of said third and fourth discrimination signals; and said step (k) includes the step of selectively enabling one of the second elements to output the output signal by counting a selection number of the second elements.

22. The data acquisition method according to claim 20, wherein said step (f) includes the step of selectively enabling one of the first elements to generate the output signal by counting a generation number of said first and second discrimination signals, said step (g) includes the step of selectively enabling one of the first elements to output the output signal in accordance with a clock signal having a predetermined period;

said step (j) includes the step of selectively enabling one of the second elements to generate the output signal by counting a generation number of said third and fourth discrimination signals; and said step (k) includes the step of selectively enabling one of the second elements to output the output signal in accordance with the clock signal.

23. The data acquisition method according to claim 20, further comprising the steps of:

(l) receiving the signals output from said first and second elements; and (m) selectively providing the signals output from said first and second elements in synchronism with a clock signal having a predetermined period.

24. The data acquisition method according to claim 20, wherein said transfer data is transferred serially.

25. The data acquisition method according to claim 20, wherein said transfer data and said strobe signal are arranged such that a coincident state and an uncoincident state are periodically alternately repeated.

26. The data acquisition method according to claim 20, wherein each of said first and second elements comprises an RS-type flip-flop.

27. A protocol control circuit comprising:

a decoder for receiving a data signal and a strobe signal, the data signal serially transferring bits of data in accordance with a predetermined period and the strobe signal being set to alternately match and not match the bits of data of the data signal, the decoder outputting first and second coincident signals and first and second not coincident signals;

a first SR-type flip-flop connected to the decoder, wherein a set input terminal thereof receives the second coincident signal and a reset input terminal thereof receives the first coincident signal, the first flip-flop generating a dataeven signal therefrom; and a second SR-type flip-flop connected to the decoder wherein a set input terminal thereof receives the second not coincident signal and a reset input terminal thereof receives the first not coincident signal, the second flip-flop generating a dataodd signal therefrom.

28. The protocol control circuit of claim 27 wherein the decoder generates the first and second coincident signals and the first and second not coincident signals, as follows:

when the transfer data bit has a low logic value and the strobe signal has a low logic value, the first coincident signal has a low logic value and the second coincident signal and the first and second not coincident signals have a high logic value;

when the transfer data bit has a low logic value and the strobe signal has a high logic value, the first and second coincident signals and the second not coincident signal have a high logic value, and the first not coincident signal has a low logic value;

when the transfer data bit has a high logic value and the strobe signal has a low logic value, the first and second coincident signals and the first not coincident signal have a high logic value, and the second not coincident signal has a low logic value; and when the transfer data bit has a high logic value and the strobe signal has a high logic value, the first coincident signal and the first and second not coincident signals have a high logic value and the second coincident signal has a low logic value.

* * * * *